Feb. 21, 1939.  W. LINTERN  2,147,906
AIR CONDITIONING APPARATUS FOR VEHICLE BODIES
Filed Jan. 15, 1935  2 Sheets-Sheet 1
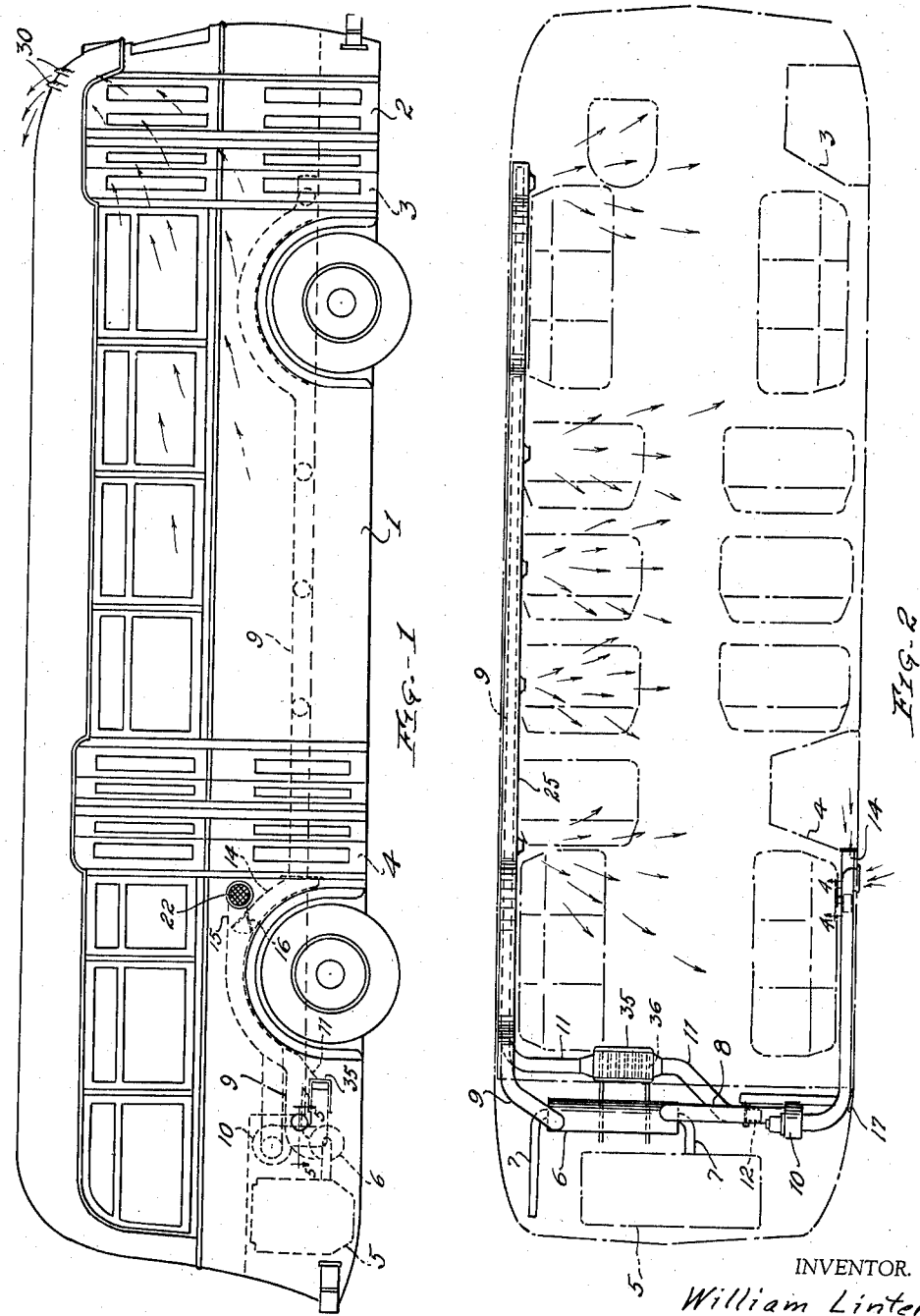
INVENTOR.
William Lintern
BY
Soule & Leonard
ATTORNEYS Feb. 21, 1939.  W. LINTERN  2,147,906
AIR CONDITIONING APPARATUS FOR VEHICLE BODIES
Filed Jan. 15, 1935  2 Sheets-Sheet 2
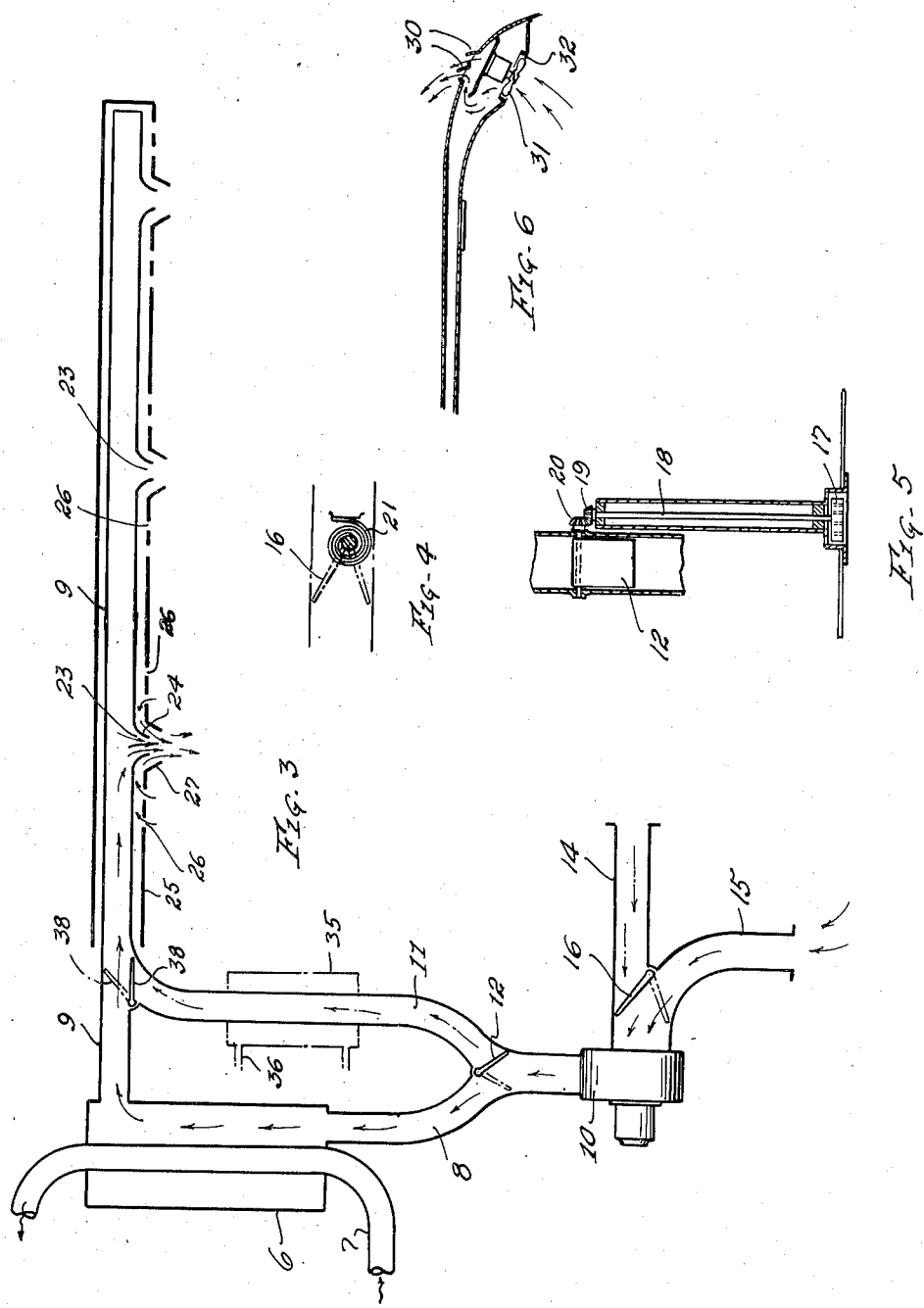
INVENTOR.
William Lintern
BY
Soule & Leonard
ATTORNEYS Patented Feb. 21, 1939

2,147,906

UNITED STATES PATENT OFFICE 2,147,906

AIR CONDITIONING APPARATUS FOR VEHICLE BODIES

William Lintern, Cleveland, Ohio, assignor, by mesne assignments to Evans Products Company, Detroit, Mich.

Application January 15, 1935, Serial No. 1,915

3 Claims. (Cl. 237—12.3)

This invention relates to an air conditioning and ventilating system for vehicle bodies, and particularly for passenger coach bodies of road and rail vehicles.

The principal objects of the present invention are to provide a system by which fresh outside air is supplied continuously to the interior of the body in as large a volume as is commensurate with the heating or cooling capacity of the particular air conditioning means available and the temperature to be maintained in the body, and by which vitiated air is removed continuously from the body in a manner such that there is a gradual forward and upward flow of the fresh conditioned air within the body at all times.

Another object is to induce air into the current of fresh air discharged into the body so as to moderate the condition of the fresh air at the points of discharge, thus reducing localized hot and cold currents.

More specific objects are to effect mixture and concurrent circulation of fresh outside air and air from the interior of the body and to maintain the intake source of the recirculated interior air at the most desirable point of the body considering fresh air and general construction.

Another specific object is to exhaust air from the body at the upper forward portion while maintaining within the body an air pressure in excess of the outside atmospheric pressure so as to create a slow filtration of air from the interior of the body to the outside and thereby prevent exhaust fumes and the like from filtering into the body.

Other objects and advantages will become apparent from the following specification and drawings, in which Figs. 1 and 2 are a side elevation and a plan view respectively of a motor coach with an air conditioning and ventilating apparatus embodying the present invention installed therein;

Fig. 3 is a diagrammatic illustration of the apparatus;

Fig. 4 is a cross sectional view of one of the dampers and operating mechanism utilized in the present invention and is taken on a plane indicated by the line 4—4 on Fig. 2;

Fig. 5 is a sectional view of another damper and operating mechanism and is taken on a plane indicated by the line 5—5 on Fig. 1 and Fig. 6 is a fragmentary sectional view of the forward portion of coach roof, showing the location of the air exhaust means.

Heretofore, it has been the practice, in heating and ventilating coach bodies, to inject the heated air into the body at spaced points therealong, either in the roof or side walls, and to remove air from the body through a series of ejector openings spaced along the top of the body or the upper level of the side walls. Such a system results in well defined localized currents of heated air directly from the points of injection to the adjacent ejectors. Consequently, a large amount of the fresh heated air is immediately withdrawn from the body without causing either efficient heating or the necessary removal of vitiated air. Necessarily, the heated air injected into the body tends to rise directly above the point of injection, and, when a series of such ejectors are used, this condition is aggravated. Not only is heat loss by virtue of these localized currents pronounced, but also objectionable differences in temperature between the localized currents and the adjacent air within the body are such that the passenger is uncomfortable, being too warm where exposed to the current and quite often too cool when directly out of the path.

In the present system, these objections are largely eliminated, the air injected into the body being in large volume at moderate temperature. Further, the air is discharged from the body at a single small zone at the forward end of the body so that an opportunity is provided for all the heat or coolness to be utilized within the body.

The advantages of the present invention are especially apparent in connection with coach bodies having forwardly positioned doors controlled by the operator, as in such instances the cold outside air admitted when the door is opened is not drawn toward the rear or to ejectors distributed along the coach body but is drawn directly toward the exhaust outlet which is close to the point of admission. Likewise the rearward movement or flow of such air into the body is opposed by the generally forwardly moving flow of conditioned air within. The rear doors on such coaches are largely emergency doors and, during general operation, are not opened and need not be considered.

Referring to Figs. 1 and 2, an illustrative embodiment of the present invention is shown installed in one of the presently used types of motor coaches having a body 1, provided with a front door 2 and step wells 3 and 4 along one side slightly forwardly of the respective sets of wheels. Coaches of this type are generally driven by a motor 5 located at the rear of the coach. Since the exhaust pipe 7 of the motor provides a large amount of heat which would otherwise be wasted, it is desirable that a heater of the exhaust operated type be provided as the source of heat. In the present instance, such a heater 6 is provided.

Referring to Fig. 3, the heater 6 comprises a casing surrounding the exhaust pipe 7 of the motor. For supplying air to be heated to the heater 6, a feed duct 8 which communicates with the interior of the heater at one end is provided. A heating duct 9, in turn, communicates with the other end of the heater 6 and leads into the interior of the body. Air is forced into the heater through the duct 8 by means of a blower 10. Communicating with the duct 8 at a point in advance of the heater is a by-pass duct 11, the by-pass duct, in turn, communicating with the duct 9 beyond the heater, so that air discharged by the blower 10 may be passed through either, or both, the heater and the duct 11, and into the duct 9 for distribution into the body.

Due to changes in outside temperature from which fresh air is supplied, it often happens that if all the outside air supplied by the blower 10 were passed through the heater 6, the air would be heated to an unduly high temperature. This is especially true on moderately cool days. In order, therefore, to supply the full volume of fresh outside air without undue heating, any portion of the outside air may be by-passed around the heater through the by-pass duct 11 until such time as the outside air is sufficiently cool so that all may pass through the heater and not be raised to too high a temperature. For accomplishing this purpose a damper 12 is provided at the junction of the ducts 8 and 11. The damper 12 is preferably pivoted so as to swing about its trailing edge across the entrance of either duct 8 or duct 11. Thus the air can be proportioned between the ducts 8 and 11 or either can be completely sealed so that all the air passes through the other.

In some instances the outside temperature is so low that the heater may not have capacity for raising the temperature thereof to that desired. In such instances, only part of the air to be circulated is drawn from the outside atmosphere, the remainder being drawn from within the body itself, thus effecting concurrent supplying of fresh air and recirculation of air within the body. In this manner, the fresh air supplied from the outside may be admitted in an amount commensurate with the heating capacity of the heater 6, thus furnishing as much fresh air as possible, and the additional volume of air required is provided from the interior of the body.

For supplying air in this manner to the blower 10, the supply ducts 14 and 15 are provided, the duct 14 communicating with the interior of the body for recirculation of air and the duct 15 communicating with the outside atmosphere. As in the case of ducts 8 and 11 a damper 16 is provided at the junction of the ducts 14 and 15 and is pivoted so that the amount of outside air and recirculated air may be proportioned as desired.

Since the radiation of heat from the body is in a comparatively fixed relation to the outside temperature, the dampers 12 and 16 may be controlled by thermostatic coils. The damper 12, for example, may be controlled by a bi-metal coil 17 which is directly exposed to the outside air near the rear of the body, the coil being operatively connected to the damper by means of a shaft 18 carrying a bevel gear 19 cooperable with a bevel gear 20 on the damper 12. The thermostat is so regulated that as the outside air is reduced below a predetermined temperature it operates to move the damper 12 toward the position to reduce the flow through the by-pass duct 11 and, upon an increase in the outside temperature to a sufficient degree, it operates to move the damper 12 to a position to by-pass a larger portion of the air supplied by the blower. In case of extreme cold, the damper 12 is moved to completely block the by-pass so that all the air supplied by the blower passes through the heater. Even under such conditions it may be that the air cannot be heated sufficiently due to the limited capacity of the heater. Accordingly, the damper 16 is provided with a bi-metal coil 21 which is subject to the temperatures within the body. Thus, if sufficient heat is not being supplied to the body, the coil 21 moves the damper 16 to a position to reduce the amount of outside air admitted through the duct 15 and to permit air to flow from within the body through the duct 14 to the blower and thus be mixed with the outside air and recirculated. The inlet opening of the duct 15 is preferably located at one side of the body in advance of the rear wheels so as to be free from exhaust fumes and foreign matter thrown into the air by the wheels and movement of the coach, the opening into the duct being covered with a suitable decorative screen 22.

Since the colder air within the body tends to settle into the step wells, the inlet end of the duct 14 is preferably located at or below the normal floor level within the step well where it may permit entrance of the coolest air within the body into the blower. Thus substantially any proportioning of inside and outside air may be obtained so that the body temperature is maintained at that required for comfort.

Referring next to the distribution duct 9, this duct is provided with a plurality of discharge ports 23 which are spaced at desired distances along the duct. It is apparent, that in order to provide sufficient heat for the entire body, the heat of the air discharged from the ports 23 must normally be somewhat in excess of the interior temperature of the body, thus tending to cause localized hotter zones which might annoy passengers. To moderate the temperature of these zones, the ports 23 are provided with discharge nozzles 24 discharging outwardly toward the center of the floor of the body. It is customary to shield the heating means and in the present instance a shield 25 is provided which extends from the floor upwardly and over the duct 9 to the side wall and is in spaced relation to the duct 9. The shield 25 is provided with a number of inlet openings 26 near the floor level and with discharge nozzles 27 which are aligned with and spaced from the nozzles 24 and slightly larger in diameter. The nozzles 27 are preferably gradually contracted in cross section from their bases to the discharge ends. Consequently, air discharged through the nozzles 24 into the gradually contracted nozzles 27 creates a Venturi effect for inducing air from the floor of the body through the openings 26 and into and around a stream of air issuing from the nozzles 24. Thus the temperature of the air discharged into the body is moderated preparatory to discharge into the body.

In order to remove vitiated air from the body, the body is preferably provided with a ventilating ejector 30, more fully described in United States Letters Patent Nos. 1,862,058 and 1,961,970, issued June 7, 1932 and June 5, 1934 respectively to William Lintern. As above set forth, however, it is desirable that all the air in the body be caused to flow gradually forwardly and upwardly and for this purpose a motor driven exhaust fan 31 is provided near the front of the body within an opening 32 in the top lining. The opening 32 communicates directly with the ventilating means 30. The walls, top and floor of the body have no air exhaust openings, except for negligible leakage, and consequently the sole zone of air exhaust is at the front and top of the body. Thus the air is continually drawn forwardly and exhausted.

It should be noted that the capacity of the blower 10 is in excess of the discharge capacity of the ejecting means so that the pressure within the body is always slightly in excess of the outside atmospheric pressure so any seepage of air will be from the interior of the body to the outside.

In extremely warm weather it is desirable to condition the air by moistening or cooling. For this purpose, a jacket 35 is provided around the by-pass duct 11, a cooling or moistening coil 36 being provided within the jacket or, if desired, across the interior of the by-pass so that the air may be cooled or moistened preparatory to discharge into the duct 9. In such instance, the damper 12 may be adjusted to close the duct 8 so that all of the air must pass through the by-pass 11. At the juncture of the by-pass 11 and duct 9 is a damper 38 which is preferably operated by the pressure of the air issuing from the heater 6 and from the by-pass duct 11. Thus when the duct 8 is completely blocked so that no air passes through the heater and all passes through the duct 11, the damper 38 is swung to a position to block that portion of the duct 9 between the heater and juncture of the by-pass so that no appreciable seepage of heated air into the body will result.

It is apparent from the foregoing description that the maximum amount of fresh air commensurate with the heating capacity of the heater or with the capacity of the cooling or moistening means is supplied to the body in a most efficient manner and is distributed and carried through the body in a manner such that localized currents or dead air pockets are substantially entirely eliminated, all of the air remaining in the body a sufficiently long time to maintain the desired temperature and condition and passing through the body in a manner such that the temperature and condition are uniform from front to rear.

While the heating effect has been most specifically discussed, the other conditioning of the air is equally important and the regulation thereof is apparent from the description of the former.

Having thus described my invention, I claim:

1. In a motor coach, a body, a continuously operating exhaust heater, and means for circulating air through the heater into the body, a feed duct communicating with the heater and with air outside of the body, a recirculating feed duct communicating with the interior of the body and with the inlet end of the heater, a heating duct communicating with the discharge end of the heater and with the interior of the body, a by-pass duct communicating with the feed ducts in advance of the heater and with the interior of the body beyond the heater, damper means for proportioning the amount of outside air and recirculated air supplied thereby, additional damper means for proportioning the amount of supplied air admitted to the heater and to the by-pass, and thermally responsive means for operating said damper means, one of said thermally responsive means being responsive to temperatures outside of the heater and body, and one being responsive to temperatures within the body.

2. In a motor coach, a body, a continuously operating exhaust heater, and means for circulating air through the heater into the body, a feed duct communicating with the inlet end of the heater and with air outside of the body, a recirculating feed duct communicating with the body and with the inlet end of the heater, a heating duct communicating with the discharge end of the heater and with the interior of the body, a by-pass duct communicating with the feed ducts in advance of the heater and with the interior of the body beyond the heater, damper means for proportioning the amount of outside air and recirculated air supplied by the feed ducts, additional damper means for proportioning the amount of supplied air admitted to the heater and to the by-pass, and thermally responsive means responsive to temperatures outside of the body and heater operatively connected to the said additional damper means to actuate said additional damper means and proportion the amount of air admitted to the heater and to the by-pass.

3. In a motor coach, a body having a floor and side walls, a heater, a heating duct, communicating with the heater and extending within the body, along the floor thereof and adjacent a side wall of the body, means for blowing air through said duct, a shield within said body for said duct in spaced relation thereto and extending from the floor to the side wall over said duct, and throughout the length of said duct, said duct having a discharge opening within the body, said shield having an opening spaced from and substantially aligned with the opening in the duct, said shield having openings adjacent the floor level and spaced from the first mentioned shield opening to admit air between the duct and shield, whereby the heated air discharged from the duct induces a flow of additional air therewith and the temperature of the discharged air may be moderated by the cooler air at the floor level.

WILLIAM LINTERN.